United States Patent [19]

Lindner et al.

[11] 4,246,068
[45] Jan. 20, 1981

[54] BOILING REACTOR WITH DIRECT FEED WATER INPUT TO THE FUEL BOXES

[75] Inventors: Johann Lindner; Olov Nylund, both of Västerås, Sweden

[73] Assignee: Aktiebolaget ASEA-ATOM, Sweden

[21] Appl. No.: 906,507

[22] Filed: May 16, 1978

[30] Foreign Application Priority Data

May 16, 1977 [SE] Sweden .............................. 7705666

[51] Int. Cl.³ .............................................. G21C 19/28
[52] U.S. Cl. ......................................... 176/61; 176/87
[58] Field of Search ................................ 176/50, 61, 87

[56] References Cited

U.S. PATENT DOCUMENTS

| | | | |
|---|---|---|---|
| 3,087,881 | 4/1963 | Treshow | 176/61 X |
| 3,108,937 | 10/1963 | Kumpf et al. | 176/61 |
| 3,180,802 | 4/1965 | West et al. | 176/61 X |
| 3,284,312 | 11/1966 | West | 176/61 X |
| 3,392,087 | 7/1968 | Braun et al. | 176/61 X |
| 3,429,775 | 2/1969 | Peterson | 176/61 X |
| 3,446,704 | 5/1969 | Hannerz et al. | 176/61 X |
| 3,621,926 | 11/1971 | Townsend | 176/50 X |
| 3,623,948 | 11/1971 | Dotson et al. | 176/61 X |
| 3,989,100 | 11/1976 | McDonald | 176/87 X |
| 4,046,628 | 9/1977 | Middleton | 176/61 X |

*Primary Examiner*—Peter A. Nelson
*Attorney, Agent, or Firm*—Polloack, Vande Sande & Priddy

[57] ABSTRACT

Boiling reactor comprising a reactor vessel and a moderator tank arranged therein which surrounds a reactor core with a plurality of vertically arranged fuel boxes. A moderator tank space located below the reactor core is provided with inlet openings for cooling water streaming through the reactor core and is in direct hydraulic connection with the lower ends of the fuel boxes. The wall of the rector vessel is provided with an opening for the supply of a first feed water flow to the cooling water flowing into the lower end of the reactor core, with the upper ends of the fuel boxes being arranged in hydraulic connection with a plurality of riser tubes by the aid of which a steam and water mixture flowing out from the fuel boxes is conducted to a plurality of water separators.

8 Claims, 3 Drawing Figures

# BOILING REACTOR WITH DIRECT FEED WATER INPUT TO THE FUEL BOXES

BACKGROUND OF THE INVENTION

From German "Auslegeschrift" No. 1,281,049 it is known to construct a nuclear reactor, operating according to the counter current principle, in such a way that a first feed water flow is fed in directly at the lower end of the reactor core whereas a second feed water flow is first subjected to a certain pre-heating by allowing it to flow downwards through the core but without making direct contact with the fuel rods, before it is connected with the first feed water flow. The reactor disclosed in the above cited publication is a pressurized water reactor of a special design, intended to be fed with cooling water of supercritical pressure, with the flow of coolant which is fed there in being equal to the flow of coolant which is leaving the reactor vessel.

OBJECTS OF THE PRESENT INVENTION

The present invention solves the task of providing a boiling reactor which is capable of operating according to the counter current principle. In a boiling reactor according to the invention, considerable advantages are achieved in comparison with known boiling reactors. The novel structural arrangement increases the possibility of influencing the core inlet temperature, the mean void content and thus the reactivity. Further improvements are a more uniform axial enthalpy and void profile, an improved emergency cooling function and a reduction of the required capacity of the steam separators.

The invention is defined by what is stated in the claims and will be described hereafter with reference to the accompanying schematic drawings, in which FIG. 1 shows a partial vertical section through a reactor according to the invention, FIG. 2 shows a partial horizontal section along II—II of FIG. 1, FIG. 3 shows a vertical view of a grid plate included in an inlet portion in FIG. 1. In accordance with normal drawing rules, fuel boxes and fuel rods should be represented by broken lines on FIG. 2, but for the purpose of simplifying the drawing work and facilitating a general view only unbroken lines have been used.

DETAILED DESCRIPTION OF A PREFERRED EMBODIMENT

Figure 1:
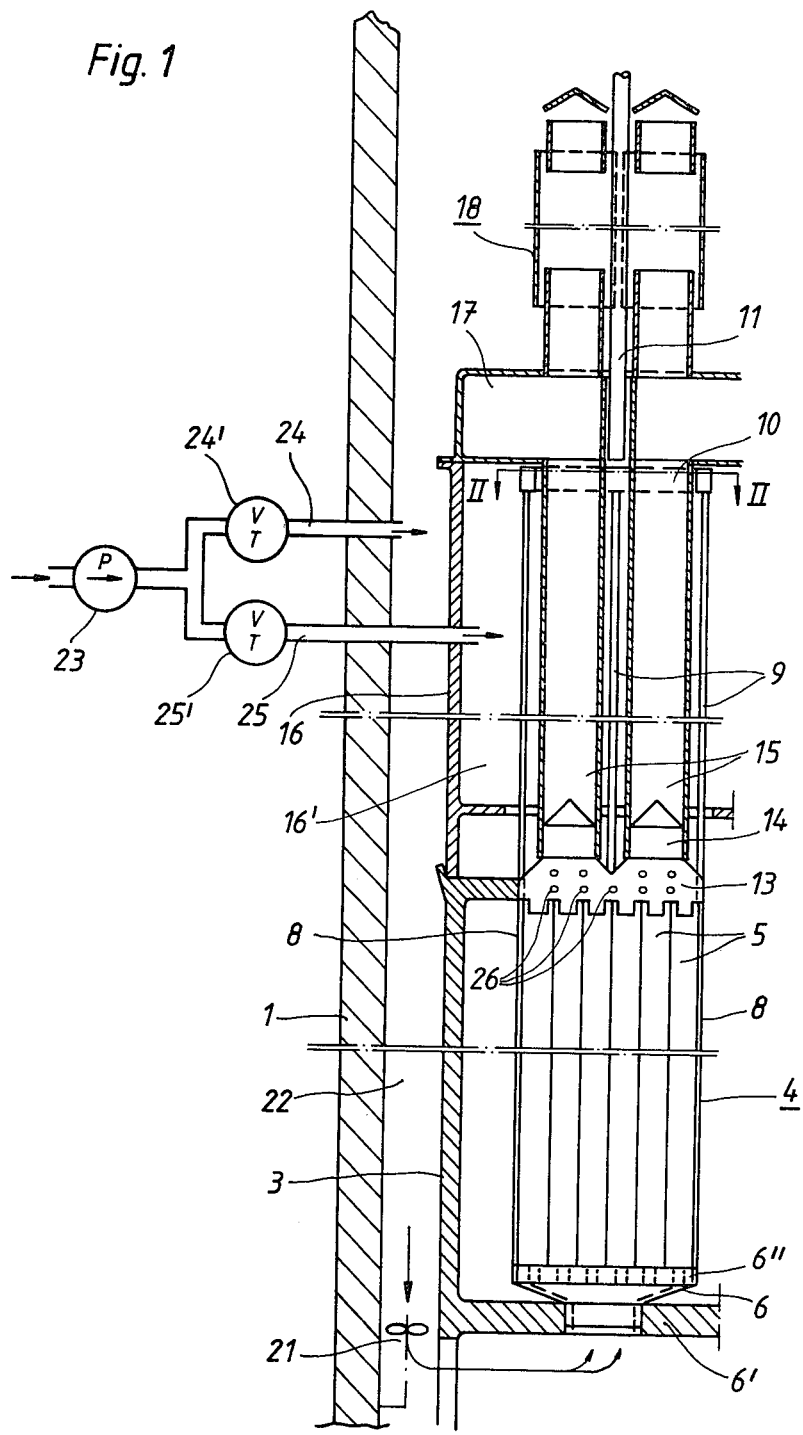

Referring to the drawings, 1 designates a reactor vessel which comprises a reactor core including a plurality of core modules 4 surrounded by a moderator tank 3. Each core module comprises thirty-six octagonally-shaped fuel boxes 5 and one inlet portion 6. The fuel boxes 5 rest on a grid plate 6" which is designed with through holes 27, with each hole 27 intended to channel water flowing through the inlet portion 6 to a separate fuel box 5. Grid plate 6" is furthermore provided with through holes 20 intended for feed water flowing downwardly through vertical channels 7 formed between fuel boxes 5. The feed water flowing through holes 20 is mixed in the inlet portion 6 with a water flow driven through downcomer 22 by a plurality of main circulating pumps 21 with the resulting stream of water flowing up through holes 27 and into fuel boxes 5.

Figure 2:
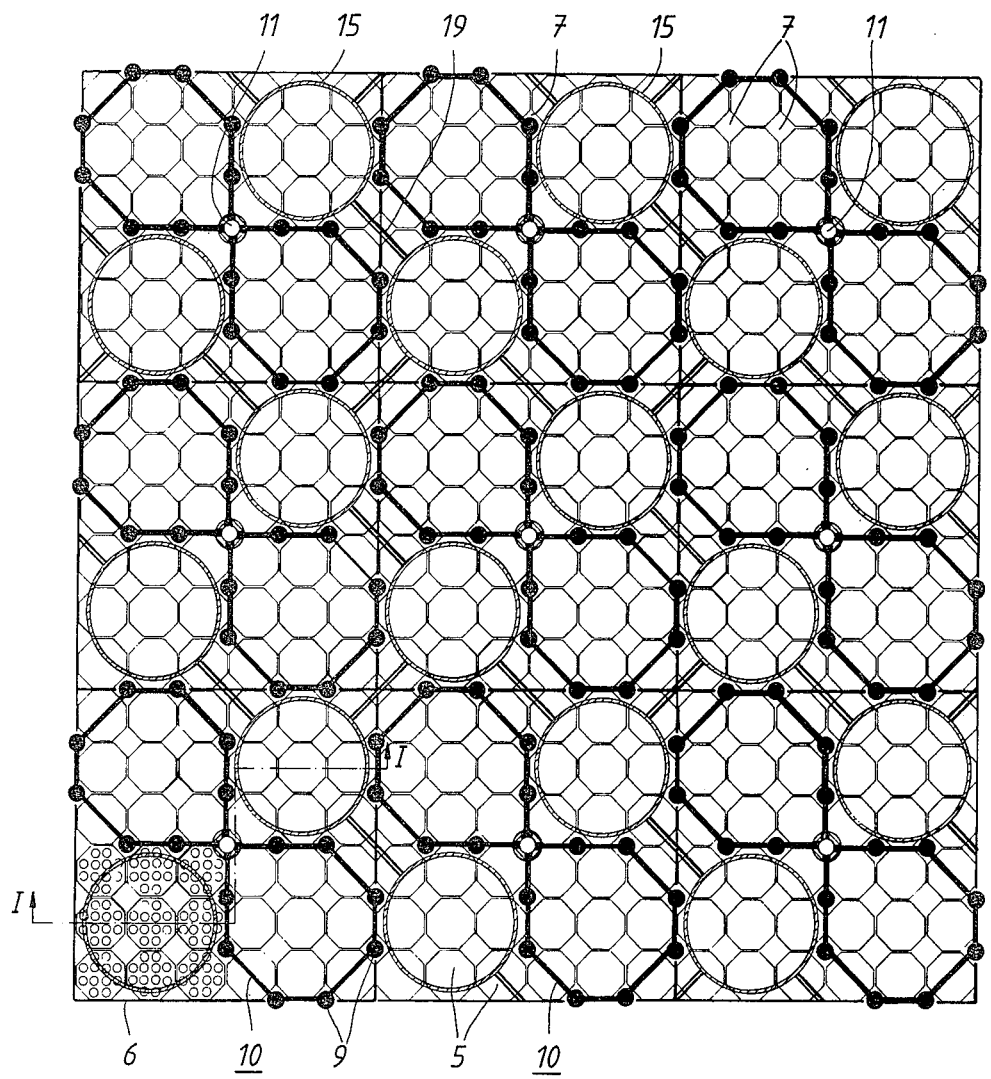
Figure 3:
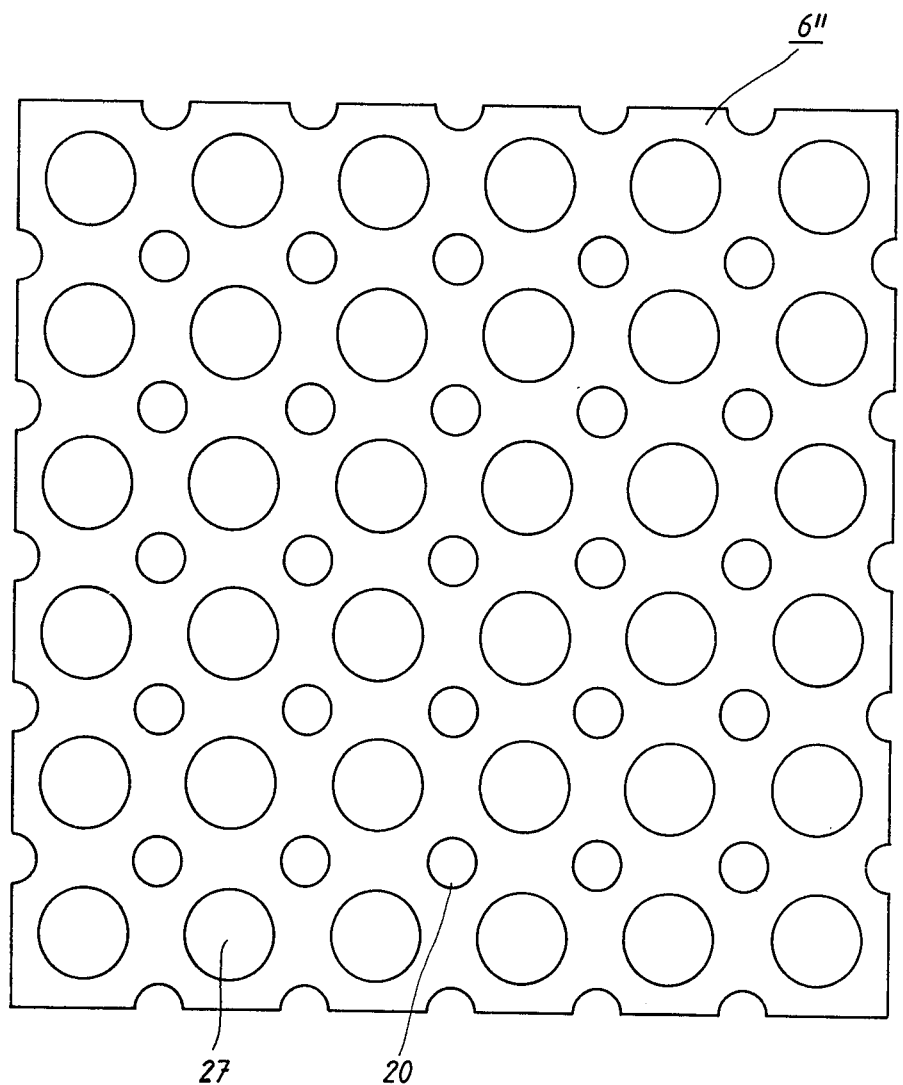

All the core modules 4 are supported by a perforated deck 6' attached to the moderator tank 3. Some of the vertical channels 7 formed between adjacent fuel boxes 5 are provided with control rod guide tubes 8 (not shown in FIG. 2) which are each intended to surround one control rod finger 9. The lower part of the control rod guide tubes 8 are flanged to the inlet portion 6. Control rod fingers 9 belonging to one and the same core module 4 are each attached to a figure-of-eight yoke 10 which is attached to the lower end of a control rod shaft 11 emanating from a control rod drive mounted in the cover of the reactor vessel. The centre line of the control rod shaft 11 coincides with the midpoint of the square inlet portion 6 and with the midpoint of yoke 10.

Yoke 10 has a middle portion which has the form of an equal-armed cross and which supports eight control rod fingers 9. Each core module 4 is provided at the top with an outlet box 13 with lead-in tubes (not shown in the drawings) for control rod fingers 9, and with two outlet studs 14, each of which extends into a separate riser tube 15. Riser tubes 15 are surrounded by a cylindrical casing 16 and open out into a collecting box 17 which is common to all core modules 4. From the collecting box 17 steam is passed to a plurality of steam separators 18. Each of the horizontal projections of the riser tubes 15 connected to a core module 4 falls into one of two quadrants, positioned on the same diagonal, of the square inlet portion 6. Yoke 10 of the control rod of a core module 4 is axially controlled by mechanical contact with the two riser tubes 15 connected to core module 4, and with the help of four risers tubes 15 belonging to adjacent core modules. Each riser tube 15 is mechanically connected to three other riser tubes 15 via three stay plates 19 positioned in a vertical plane, said other riser tubes 15 being connected to the same core module.

Feed water is pumped by a feed water pump 23 to two water inlet conduits 24 and 25 extending through the wall 1 of the reactor vessel, with each of the conduits 24 and 25 being provided with a throttle valve 24' and 25', respectively. The water flow driven by the feed water pump 23 is at the most one-third of the total water flow driven through downcomer 22 by means of main circulating pumps 21. Conduit 24 opens out into the hollow-cylindrical downcomer 22, whereas conduit 25 is led into the cylindrical casing 16. Valve 25' is adjusted with less throttling than valve 24', resulting in the pressure in conduit 25 being higher than in conduit 24. Together with outer limit surfaces of riser tubes 15, outlet boxes 13, collecting box 17 and moderator tank 3, casing 16 forms a distributing chamber 16'. The feed water discharged from conduit 25, known as the channel flow, flows via the distributing chamber 16' into some of channels 7 through guide tubes 8 for control rod fingers 9, and into the other channels through similar tubes 26 which, like guide tubes 8, traverse outlet box 13 while sealing thereagainst and open out into the space between and around riser tubes 15. The water flow emanating from conduit 25 is heated in channels 7 and then leaves these through holes 20 in grid plate 6".

By varying the adjustment of valves 24' and 25', it is possible to vary the proportion of the relatively warm channel flow the total flow of coolant flowing through the fuel boxes 5 and thus influence the core inlet temperature. For example, an increase of the flow through conduit 25 and a corresponding reduction of the flow through conduit 24 results in an increase in temperature of the water flowing into the fuel boxes 5. An adjustable core inlet temperature means that the mean void content and therefore the reactivity can be regulated.

Being able to regulate the reactivity in this manner is of particular importance when it is a question of reactors in which the control rods and the control rod drives are arranged above the reactor core, since such an arrangment results in a reduction of the applicability of the control rods as reactivity-regulating means.

The channel flow provides heat transfer from the core top to the core inlet. This results in a more even axial enthalpy and a more even axial void profile.

A reactor according to the invention has the additional advantage in that the water flow flowing between the fuel boxes 5 may continue to provide a certain amount of cooling of the core even if the normal cooling system for some reason would become ineffective, thereby providing a reactor according to the invention with a permanently active emergency core cooling system.

I claim:

1. Boiling reactor comprising a reactor vessel and a moderator tank arranged therein which surrounds a reactor core with a plurality of closely spaced, vertically extending fuel boxes, a moderator tank space located below the reactor core being provided with inlet openings for cooling water streaming through the reactor core and being in direct hydraulic connection with the lower ends of said fuel boxes, the wall of the reactor vessel being provided with an opening for the supply of a first feed water flow to the cooling water flowing into the lower end of the reactor core, the upper ends of the fuel boxes being arranged in hydraulic connection with a plurality of riser tubes by the aid of which a steam-water mixture flowing out from the fuel boxes is conducted to a plurality of steam separators, wherein the improvement comprises: a plurality of vertically extending channels spaced from and substantially isolated from one another and arranged between the confronting end wall portions of the fuel boxes, with upper ends of said vertically extending channels hydraulically connected to a distributing chamber provided with an inlet conduit extending through the wall of the reactor vessel to provide a second feed water flow passageway.

2. Boiling reactor according to claim 1, wherein said distribution chamber encloses said riser tubes.

3. A boiler reactor assembly according to claim 2, wherein said selectively adjustable control means comprises at least one throttling valve positioned in a fluid conduit forming a flow path between said source of additional feed water and said channel means.

4. Boiling reactor according to claim 3, wherein the hydraulic connection extending between upper ends of said vertical channels and said distribution chamber comprises a plurality of tubes extending through the wall of said common outlet box.

5. In a boiling reactor assembly of the type including a reactor vessel surrounding a moderator tank, a reactor core comprising a plurality of substantially vertically extending, hot fuel boxes closely spaced to one another within said moderator tank and arranged such that inlet portions of said respective fuel boxes are in direct fluid communication with an inlet portion of said moderator tank, allowing feed water entering the inlet portion of said moderator tank to flow through said fuel boxes in a substantially vertically upward direction;

wherein said improvement comprises:

passageway means having an inlet portion in fluid communication with a source of feed water and an outlet portion in fluid communication with the inlet portion of said moderator tank for transporting relatively cool feed water through said inlet portion of said moderator tank and into said fuel boxes positioned in fluid communication therein;

channel means having an inlet in fluid communication with a source of feed water and having an outlet in fluid communication with the inlet portion of said moderator tank for transporting additional feed water through said inlet portion of said moderator tank and into said fuel boxes positioned in fluid communication therein, with said channel means extending between said substantially vertically extending hot fuel boxes for preheating said additional feed water prior to entry into said inlet portion of said moderator tank;

said channel means comprising a plurality of separate, substantially vertically extending channels spaced from one another and formed by confronting end wall portions of adjacently disposed fuel foxes, with further confronting surface portions of said adjacently disposed fuel boxes positioned to substantially prevent said additional feed water from flowing between said spaced channels; and selectively adjustable control means for controlling the amount of feed water entering said passageway means and additional feed water entering said channel means, respectively, to control the final temperature of the feed water entering said inlet portion of said moderator tank and the inlet portions of said hot fuel boxes in direct fluid communication therewith.

6. A boiler reactor assembly according to claim 5, wherein said passageway means comprises a downcomer formed by confronting surfaces of said reactor vessel and said moderator tank positioned therein.

7. A boiler reactor assembly according to claim 5, wherein said selectively adjustable control means comprises at least one throttling valve positioned in a fluid conduit forming a flow path between said source of feed water and said passageway means.

* * * * *